(12) United States Patent
Kawanishi et al.

(10) Patent No.: US 11,036,173 B2
(45) Date of Patent: Jun. 15, 2021

(54) IMAGE READING DEVICE AND RECORDING APPARATUS

(71) Applicant: CANON KABUSHIKI KAISHA, Tokyo (JP)

(72) Inventors: Masahiro Kawanishi, Yokohama (JP); Kazuyuki Morinaga, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 16/284,952

(22) Filed: Feb. 25, 2019

(65) Prior Publication Data

US 2019/0265629 A1 Aug. 29, 2019

(30) Foreign Application Priority Data

Feb. 28, 2018 (JP) .............................. JP2018-035517

(51) Int. Cl.
*G03G 15/00* (2006.01)
*H04N 1/00* (2006.01)

(52) U.S. Cl.
CPC ....... *G03G 15/605* (2013.01); *H04N 1/00554* (2013.01)

(58) Field of Classification Search
CPC .................................................. G03G 15/605
USPC ....................................................... 399/367
See application file for complete search history.

(56) References Cited

U.S. PATENT DOCUMENTS

| | | | | |
|---|---|---|---|---|
| 5,126,787 A * | 6/1992 | Irie | .................... | G03B 27/6264 355/75 |
| 5,621,501 A * | 4/1997 | Matsuo | ................ | G03G 15/605 355/75 |
| 2003/0049061 A1 * | 3/2003 | Hata | .................. | H04N 1/00519 399/367 |
| 2003/0198493 A1 * | 10/2003 | Gomi | ................... | G03G 15/605 399/380 |
| 2004/0045129 A1 * | 3/2004 | Tamehira | ............. | G03G 15/605 16/223 |
| 2004/0218229 A1 * | 11/2004 | Choi | ....................... | B41J 29/13 358/474 |
| 2007/0251065 A1 * | 11/2007 | Spaggiari | ............... | B29C 45/44 29/23.51 |

(Continued)

FOREIGN PATENT DOCUMENTS

| | | |
|---|---|---|
| CN | 101207683 A | 6/2008 |
| CN | 104601851 A | 5/2015 |
| JP | 2003-87463 A | 3/2003 |

*Primary Examiner* — Anthony H Nguyen

(74) *Attorney, Agent, or Firm* — Canon U.S.A., Inc. I.P. Division (57) ABSTRACT

An image reading device includes a reading main unit including a document platen capable of being loaded with a document, a document cover configured to press the document against the document platen, and a hinge mechanism configured to move between a first position and a second position with respect to the reading main unit, wherein the reading main unit includes a first abutment portion capable of abutting the document cover, and wherein an open angle of the document cover with respect to the document platen is regulated to a first angle by abutment between the document cover and the first abutment portion when the hinge mechanism is in the first position, and the open angle is regulated to a second angle larger than the first angle by a regulation portion provided in the hinge mechanism when the hinge mechanism is in the second position.

17 Claims, 12 Drawing Sheets

(56) References Cited

U.S. PATENT DOCUMENTS

2016/0006899 A1\* 1/2016 Kang ................. H04N 1/00551
                                                              358/474
2017/0048407 A1   2/2017 Tanaka
2017/0070626 A1\* 3/2017 Ikeda ................. H04N 1/00538
2018/0347247 A1\* 12/2018 Kondo ..................... E05D 5/02

\* cited by examiner

IMAGE READING DEVICE AND RECORDING APPARATUS

BACKGROUND OF THE INVENTION

Field of the Invention

The present disclosure relates to an image reading device and a recording apparatus.

Description of the Related Art

Japanese Patent Application Laid-Open No. 2003-87463 discusses a configuration in which an open angle for opening of a document conveyance device with respect to an image forming apparatus can be selected from two kinds of angle. A user can switch the open angle between a first open position and a second open position, by switching the orientation of a stopper to be attached to a fixed member of a hinge.

In the configuration discussed in Japanese Patent Application Laid-Open No. 2003-87463, however, the stopper for fixing the open angle is necessary. Further, in order to change the open angle, it is necessary for the user to insert a screw into the stopper to fasten the stopper to the hinge.

SUMMARY OF THE INVENTION

The present disclosure is directed to an image reading device in which an open angle of a document cover can be easily changed.

According to an aspect of the present disclosure, an image reading device includes a reading main unit including a document platen capable of being loaded with a document and a first reading portion capable of reading the document loaded on the document platen, a document cover configured to press the document against the document platen, and a hinge mechanism configured to connect the reading main unit and the document cover, and configured to move between a first position and a second position with respect to the reading main unit, wherein the reading main unit includes a first abutment portion capable of abutting the document cover, and wherein an open angle of the document cover with respect to the document platen is regulated to a first angle by abutment between the document cover and the first abutment portion when the hinge mechanism is in the first position, and the open angle is regulated to a second angle larger than the first angle by a regulation portion provided in the hinge mechanism when the hinge mechanism is in the second position.

Further features of the present disclosure will become apparent from the following description of exemplary embodiments with reference to the attached drawings.

DESCRIPTION OF THE EMBODIMENTS

An embodiment of the present disclosure is applicable to a reading apparatus (a document reading apparatus) that includes an automatic document feeder (hereinafter referred to as "ADF") serving as an automatic document conveyance device, and reads a document using an image sensor (a reading unit). In another embodiment of the present disclosure, a recording apparatus has a reading function and a recording function of recording an image. The recording apparatus includes a multifunction peripheral (MFP) that has, in addition to a print function (a recording function), a facsimile function, and other functions. Another embodiment of the present disclosure is applicable to a recording apparatus that has a recording function of recording an image on a recording medium, in place of the reading function. In this case, a feeding tray is loaded with a recording medium that is a target for recording the image, in place of the document. Further, in this case, a recording unit is provided in a conveyance path in place of the reading unit, and the image is recorded on the recording medium conveyed by the recording unit. The size, material, and shape of each of components described in the following exemplary embodiment as well as relative positions thereof can be appropriately modified depending on a configuration and various conditions of an apparatus to which the present disclosure is applied, and are not intended to limit the scope of the present disclosure thereto.

Figure 1:
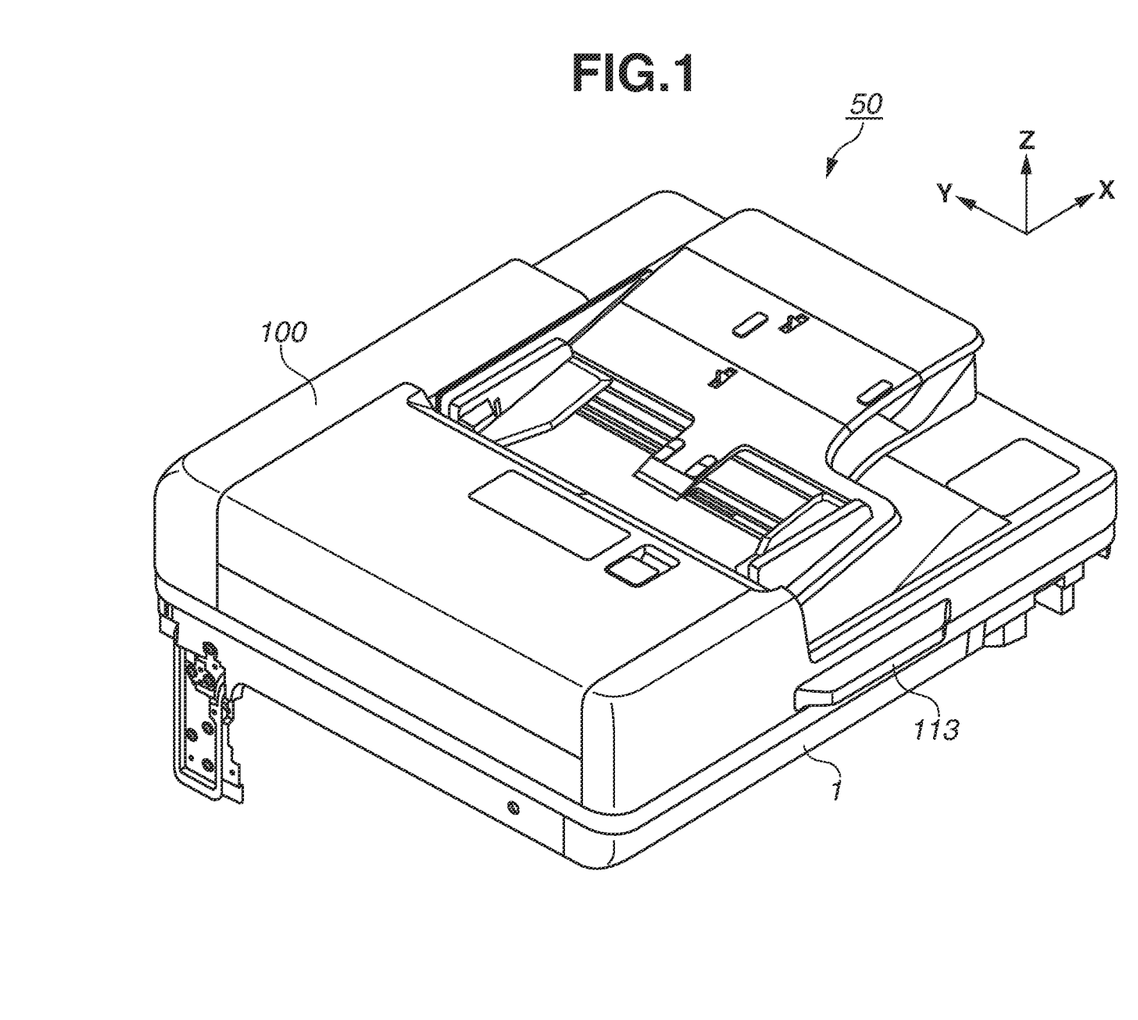
FIG. 1 is a perspective view of an outer appearance of an image reading device.
Figure 2:
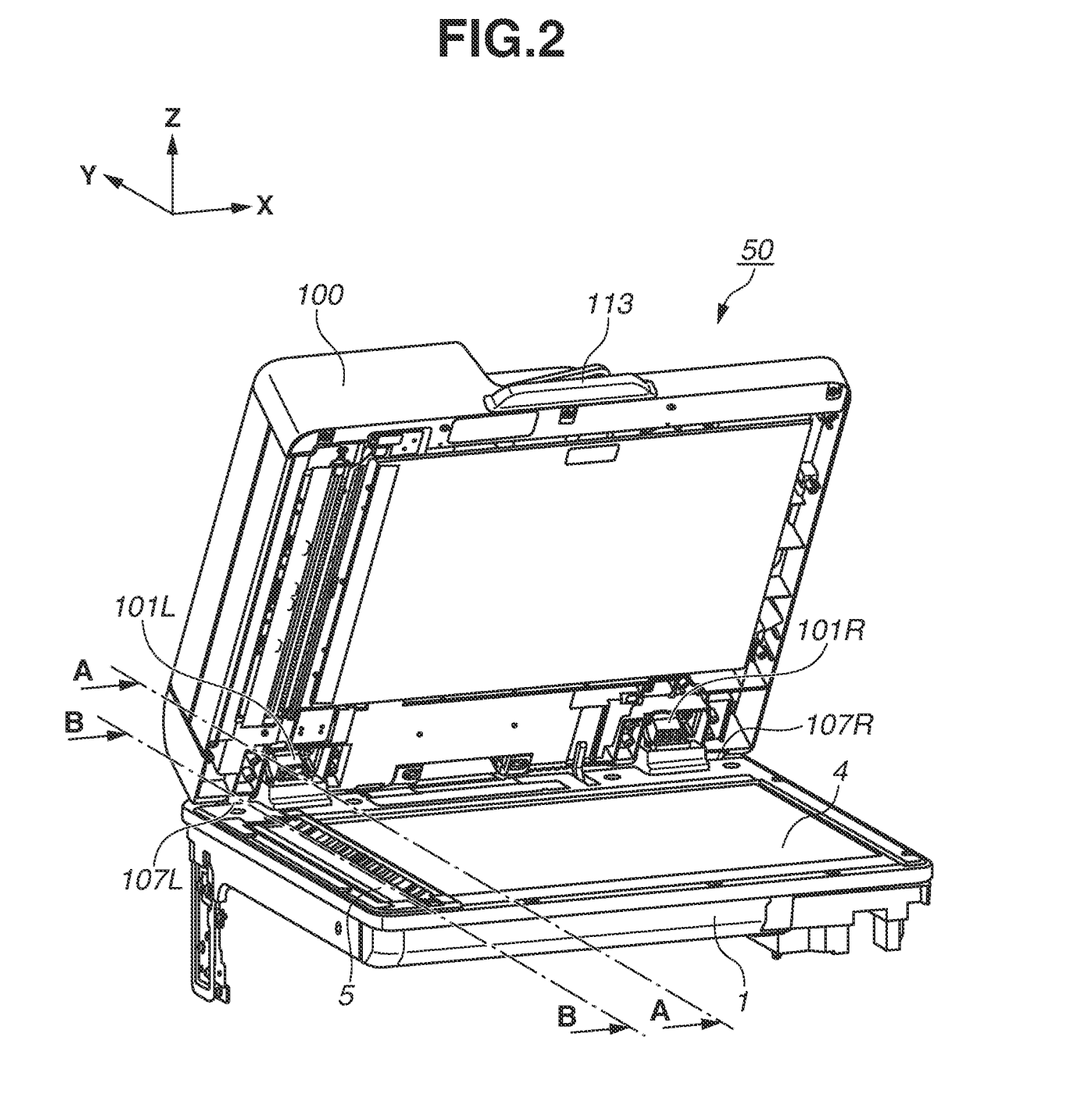
FIG. 2 is a perspective view of an outer appearance of the image reading device.

FIG. 1 and FIG. 2 each illustrate an external perspective view of an image reading device 50. The image reading device 50 may be disposed above an apparatus such as a recording apparatus including a recording unit. The image reading device 50 includes a reading main unit 1 and an ADF 100. The reading main unit 1 has a document glass plate 4 that can be loaded with a document. The ADF 100 is connected to the reading main unit 1 by a hinge mechanism 101, and can be opened and closed with respect to the reading main unit 1. The hinge mechanism 101 is disposed on each of the right side and the left side in an X direction illustrated in FIG. 2, and is disposed on the device rear side (on the downstream side in a Y direction). The hinge mechanism 101 disposed on the right side is a right hinge mechanism 101R, and the hinge mechanism 101 disposed on the left side is a left hinge mechanism 101L. Further, the image reading device 50 is provided with a hold member 113 to be held by a user when the user opens and closes the ADF 100. Furthermore, a first stopper portion 107 to be described below is provided further outward than the hinge mechanism 101 on each of the right side and the left side. FIG. 2 illustrates a state where the ADF 100 is open with respect to the reading main unit 1. The hinge shaft of the left hinge mechanism 101L and the hinge shaft of the right hinge mechanism 101R are provided substantially on the same axis to form a common pivot.

Figure 3:
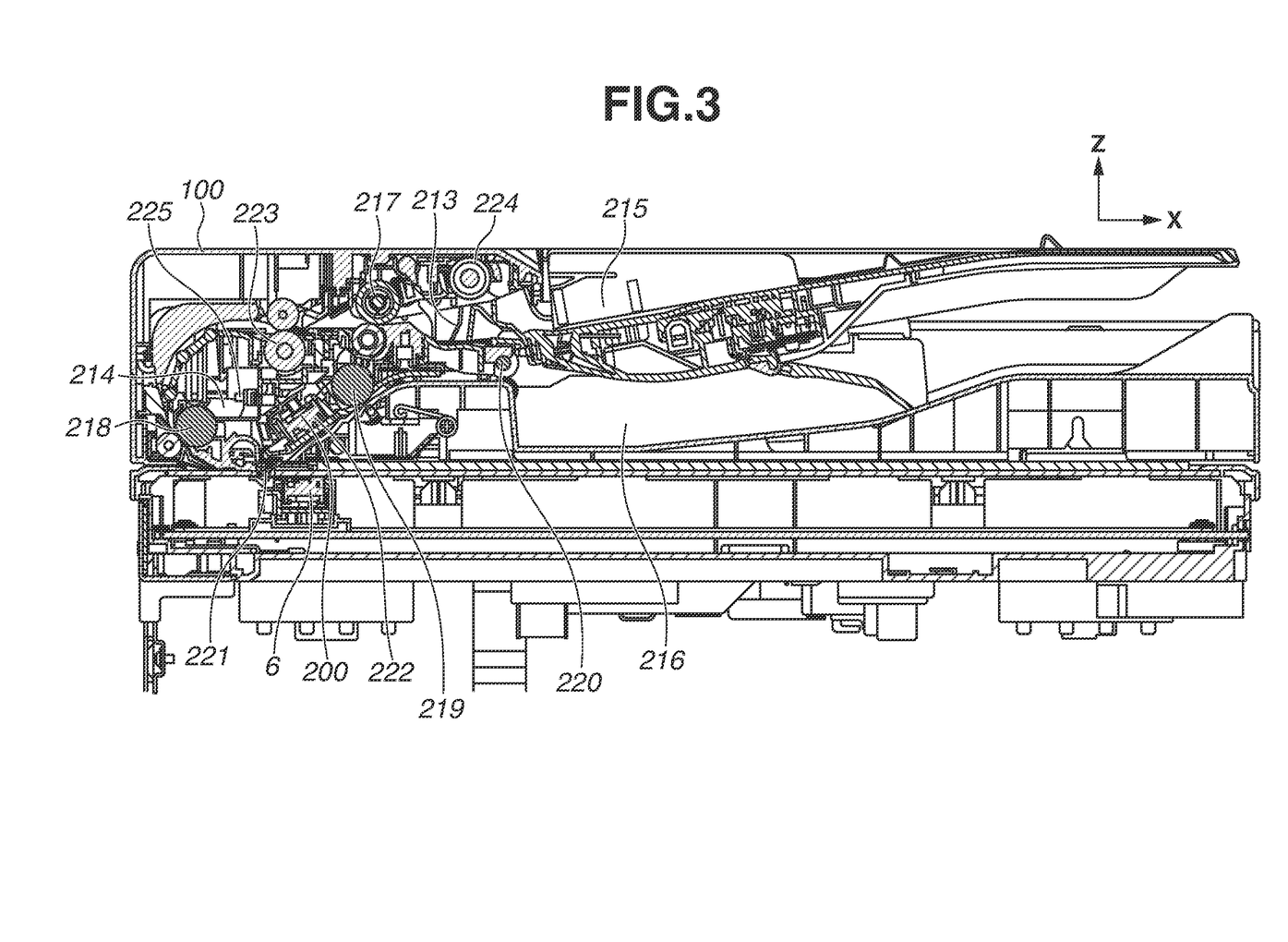
FIG. 3 is a cross-sectional diagram illustrating an inner structure of an automatic document feeder (ADF) of the image reading device.

FIG. 3 is a cross-sectional diagram illustrating an inner structure of the ADF 100 when the image reading device 50 is viewed from the front side. The ADF 100 has a conveyance path for conveying a document, and the conveyance path has a U-turn path for a document to reverse by making a U-turn while being conveyed. The document set in a document tray 215 is conveyed toward the upstream side in the X direction. Afterward, the document is reversed while forming a U shape and then conveyed toward the downstream side in the X direction. The document is then ejected to an ejection tray 216 disposed below the document tray 215.

The ADF 100 includes a document detection sensor 213 and an edge sensor 225. The document detection sensor 213 is provided to detect the presence or absence of a document set in the document tray 215. The edge sensor 225 is provided to determine the timing of reading, by detecting the leading edge of the document. The edge sensor 225 can detect the passage of the leading edge and the trailing edge of the document, using an edge sensor lever 214 that operates depending on the presence or absence of the document.

A pickup roller 224, a separation roller 217, and a registration roller 223 are provided in this order from a position near a feeding port of the ADF 100 and on the upstream side in the U-turn path. The pickup roller 224 picks up the loaded document. The separation roller 217 separates the documents one by one. The registration roller 223 corrects a skew of the document. Further, a first conveyance roller 218 and a second conveyance roller 219 are each provided at a point in the U-turn path. At a position near an ejection port of the ADF 100 and on the downstream side in the U-turn path, an ejection roller 220 is provided to eject the document to the ejection tray 216. These rollers can be rotated by a motor M (see FIG. 4) to be described below.

Details of document reading operation (a sheet through reading system) to be performed by the ADF 100 will be described below. When documents are set in the document tray 215 by the user, the document detection sensor 213 detects the documents. Subsequently, based on a command for starting the reading operation, the pickup roller 224 picks up a document, the separation roller 217 separates the document and conveys the separated document, and the registration roller 223 corrects a skew. When the edge sensor 225 detects the leading edge of the reversed document being conveyed by the first conveyance roller 218, the document is sent to a position between a conveyance guide member 221 and an ADF glass 5 (see FIG. 2) provided in the reading main unit 1. The conveyance guide member 221 enhances the accuracy of reading, by pressing the document against the reading main unit 1 by an elastic mechanism.

After the leading edge of the document is detected by the edge sensor 225, the document is conveyed until the step count of the motor M becomes a predetermined number. When the step count of the motor M becomes the predetermined number, the leading edge of the document arrives at a first reading sensor 6. The first reading sensor 6 reads a first face of the document, coinciding with the conveyance by the first conveyance roller 218. Here, the first face corresponds to the top surface of the document in a state where the document is set in the document tray 215. The first reading sensor 6 is disposed below the ADF glass 5.

The document is then conveyed downstream from the conveyance guide member 221. Afterward, the document is conveyed along a second reading sensor supporting portion 222, until the step count of the motor M becomes a predetermined number following the start of the reading by the first reading sensor 6. When the step count of the motor M becomes the predetermined number, a second reading sensor 200 reads a second face. Here, the second face is on the backside of the first face, and corresponds to the undersurface of the document in the state where the document is set in the document tray 215.

Subsequently, the edge sensor 225 detects the trailing edge of the document, and then the document is conveyed until the step count of the motor M becomes a predetermined number. When the step count of the motor M becomes the predetermined number, the reading by the second reading sensor 200 ends following the end of the reading by the first reading sensor 6. Upon passing through the second reading sensor 200, the document passes through the second conveyance roller 219 and the ejection roller 220. The document is then ejected to the ejection tray 216. In this way, the timing of the conveyance of the document by each roller and the timing of reading are made to coincide with each other, by acquiring a distance from each of the first reading sensor 6 and the second reading sensor 200 to the leading/trailing edge of the document, based on the step count of the motor M.

Figure 4:
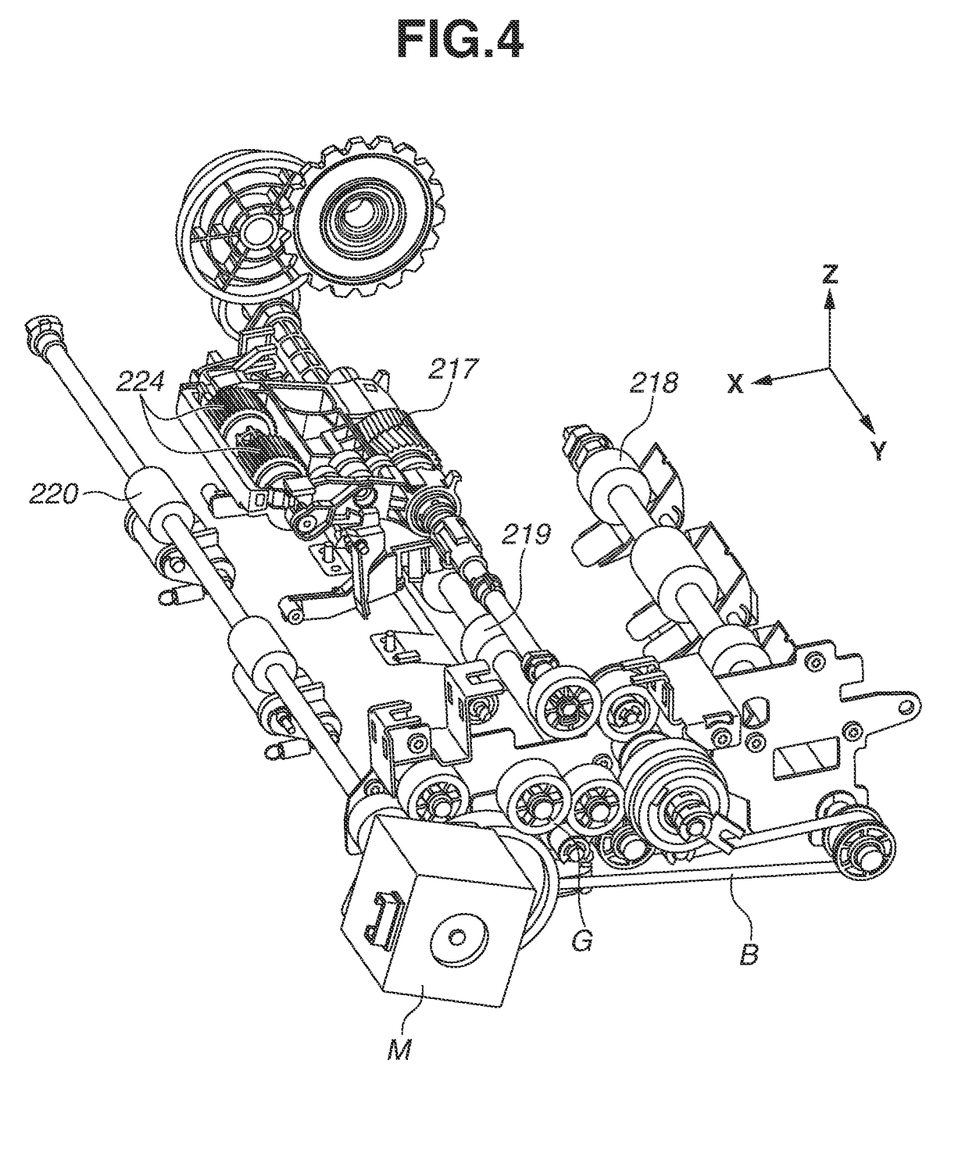
FIG. 4 is a perspective view of a chain of drives in the ADF of the image reading device.

FIG. 4 is a perspective view of a chain of drives of the ADF 100 as viewed from the rear side of the image reading device 50. The driving force from the motor M is transmitted via an intermediate gear unit G and a belt driving unit B to drive the pickup roller 224, the separation roller 217, the registration roller 223 (not illustrated in FIG. 4), the first conveyance roller 218, the second conveyance roller 219, and the ejection roller 220.

Figure 5:
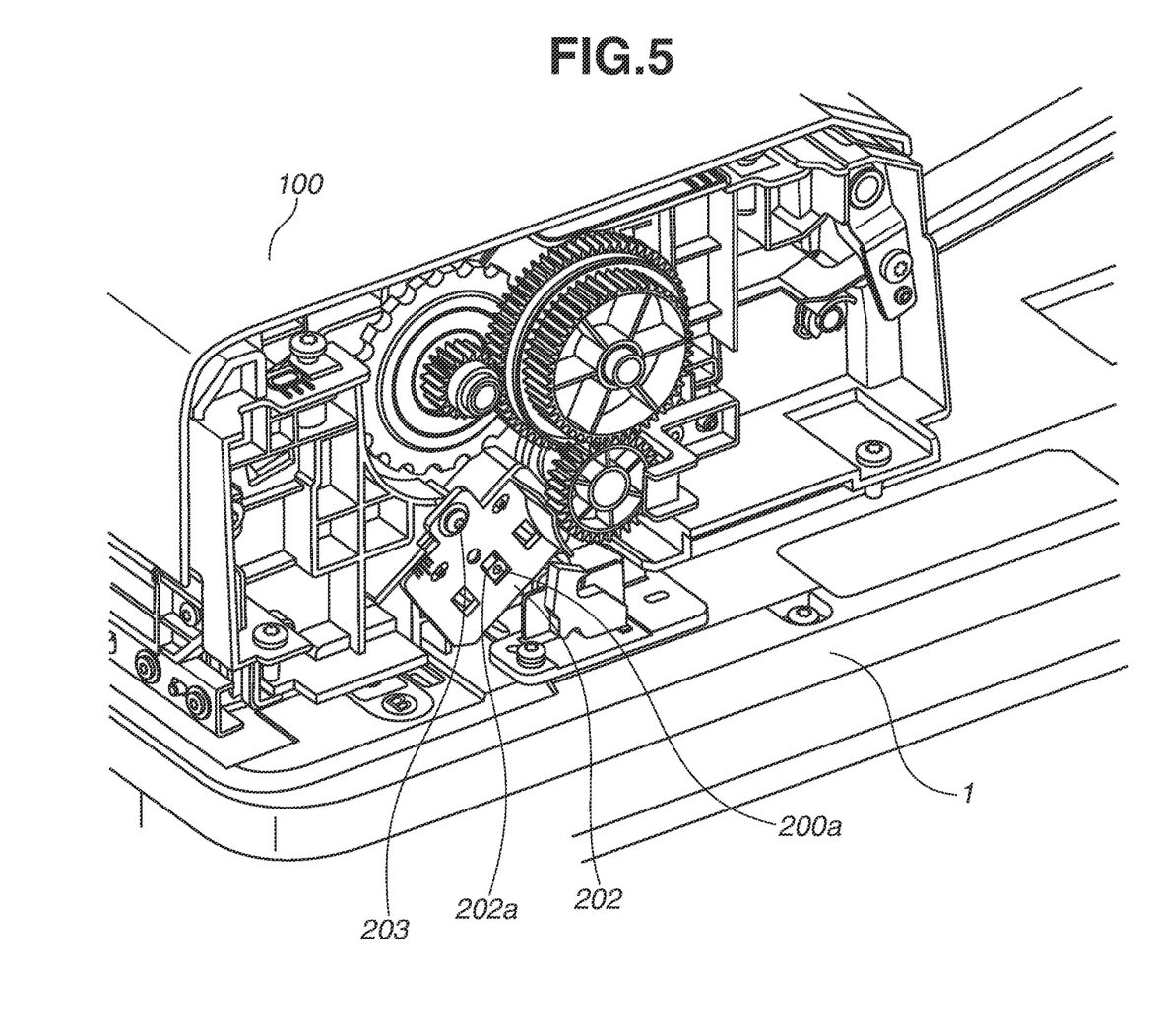
FIG. 5 is a perspective view of an adjustment mechanism of a second reading sensor of the image reading device.
Figure 6:
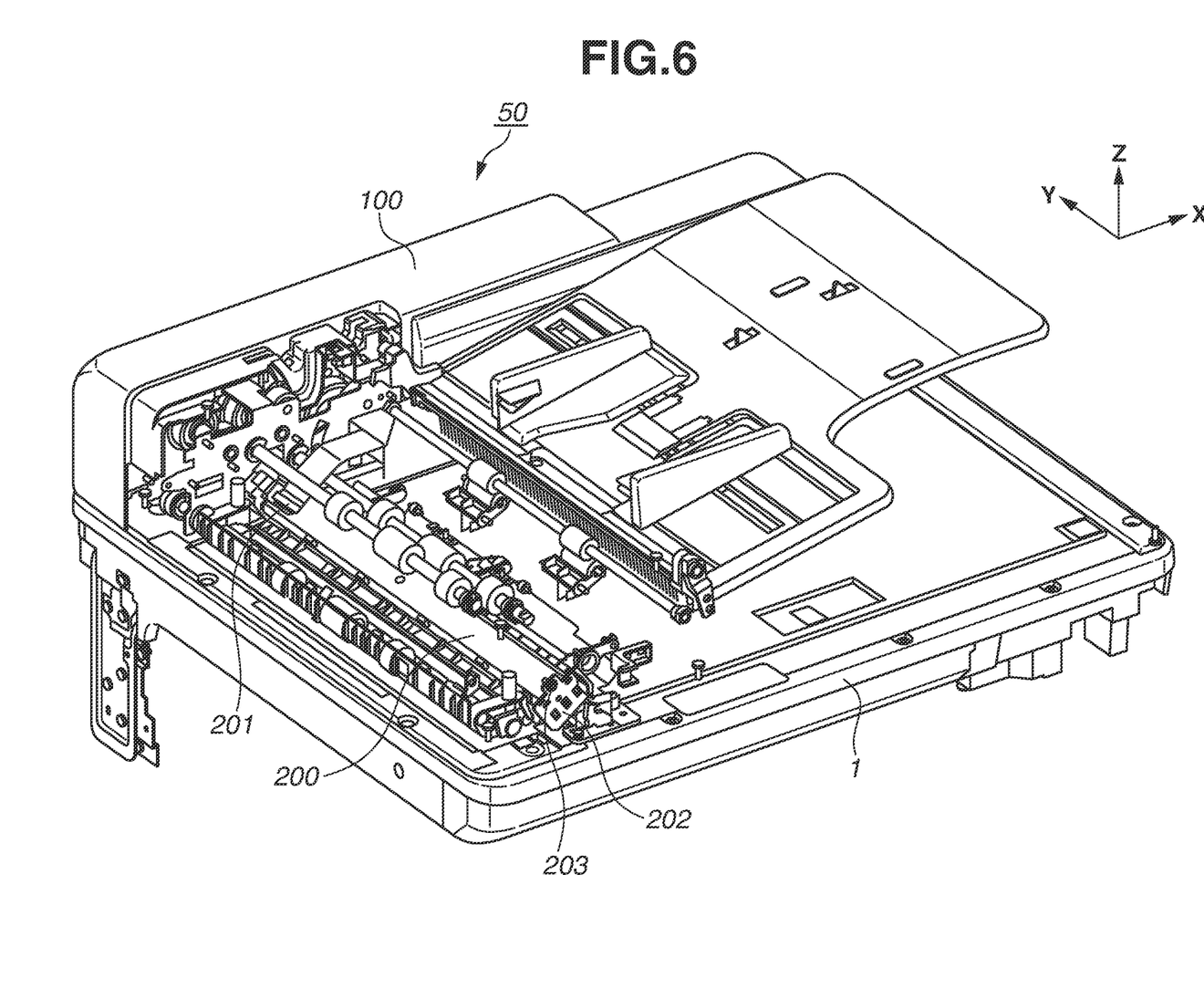
FIG. 6 is a perspective view of an inner structure of the ADF of the image reading device.

Next, an adjustment mechanism of the second reading sensor 200 of the present exemplary embodiment will be described with reference to FIG. 5 and FIG. 6. FIG. 5 is a perspective view of the adjustment mechanism of the second reading sensor 200 as viewed from the front side of the image reading device 50. FIG. 6 is a perspective view of an inner structure of the ADF 100. The image reading device 50 has the adjustment mechanism that can adjust a relative angle between the conveyance direction of a document conveyed by the ADF 100, and each of the first reading sensor 6 and the second reading sensor 200. The first reading sensor 6 and the second reading sensor 200 are thereby disposed to be orthogonal to the document when the document is read, so that skew reading of the document is inhibited.

An operator performs an angle adjustment between the first reading sensor 6 and the conveyance direction of the document, by changing the attachment position of the ADF 100 with respect to the reading main unit 1. Specifically, the operator performs the positioning of the ADF 100, by moving the right hinge mechanism 101R illustrated in FIG. 2, in the Y direction. The ADF 100 can thereby pivot about the left hinge mechanism 101L with respect to the reading main unit 1, and the first reading sensor 6 can be adjusted to be orthogonal to the conveyance direction of the document.

It is necessary to perform the angle adjustment between the second reading sensor 200 and the conveyance direction of the document, after performing the above-described angle adjustment between the first reading sensor 6 and the conveyance direction of the document. In the present exemplary embodiment, the angle adjustment between the second reading sensor 200 and the conveyance direction of the document is performed by adjusting the attachment angle of the second reading sensor 200 in the inside of the ADF 100. As illustrated in FIG. 5, a second reading sensor adjustment member 202 is provided on the front side of the image reading device 50. The second reading sensor adjustment member 202 has an engagement hole 202a, and the second reading sensor 200 has a protruding portion 200a. The protruding portion 200a is inserted into the engagement hole 202a, so that the protruding portion 200a and the engagement hole 202a are engaged with each other. The second reading sensor 200 is thereby fixed at a position with respect to the second reading sensor adjustment member 202.

Further, on the front side of the image reading device 50, the second reading sensor adjustment member 202 is disposed to be slidable in the X direction that is the conveyance direction of the document, with respect to the main body of the ADF 100. On the other hand, on the rear side of the image reading device 50, the second reading sensor 200 is fixed at a position with respect to the ADF 100. In this way, the second reading sensor 200 is fixed at the position on the rear side of the image reading device 50, and configured to slide in the X direction on the front side, so that the second reading sensor 200 can pivot about the rear side with respect to the ADF 100. The operator slides the second reading sensor adjustment member 202 in the X direction and pivots the second reading sensor adjustment member 202. The operator then tightens a screw 203 as illustrated in FIG. 5, so that the second reading sensor adjustment member 202 is fixed to the main body of the ADF 100 at a desired angle. This completes the positioning of the second reading sensor 200.

The above-described sensor positioning is performed when the image reading device 50 is assembled in a factory or during maintenance by a service staff. As illustrated in FIG. 6, in the image reading device 50, the second reading sensor adjustment member 202 is provided on the device front side, and a connector 201 for transmitting a reading signal is provided on the device rear side. Furthermore, a component such as a relay board that relays a signal of the second reading sensor 200 to a main board of the apparatus main body is also disposed on the rear side of the image reading device 50. In this way, the second reading sensor adjustment member 202 is provided on the device front side, and an electrical component such as the connector 201 is provided on the rear side. This prevents the operator from accidentally coming in contact with the electrical component when performing the positioning, so that damage to an electronic element due to a cause such as static electricity can be prevented.

Figure 7:
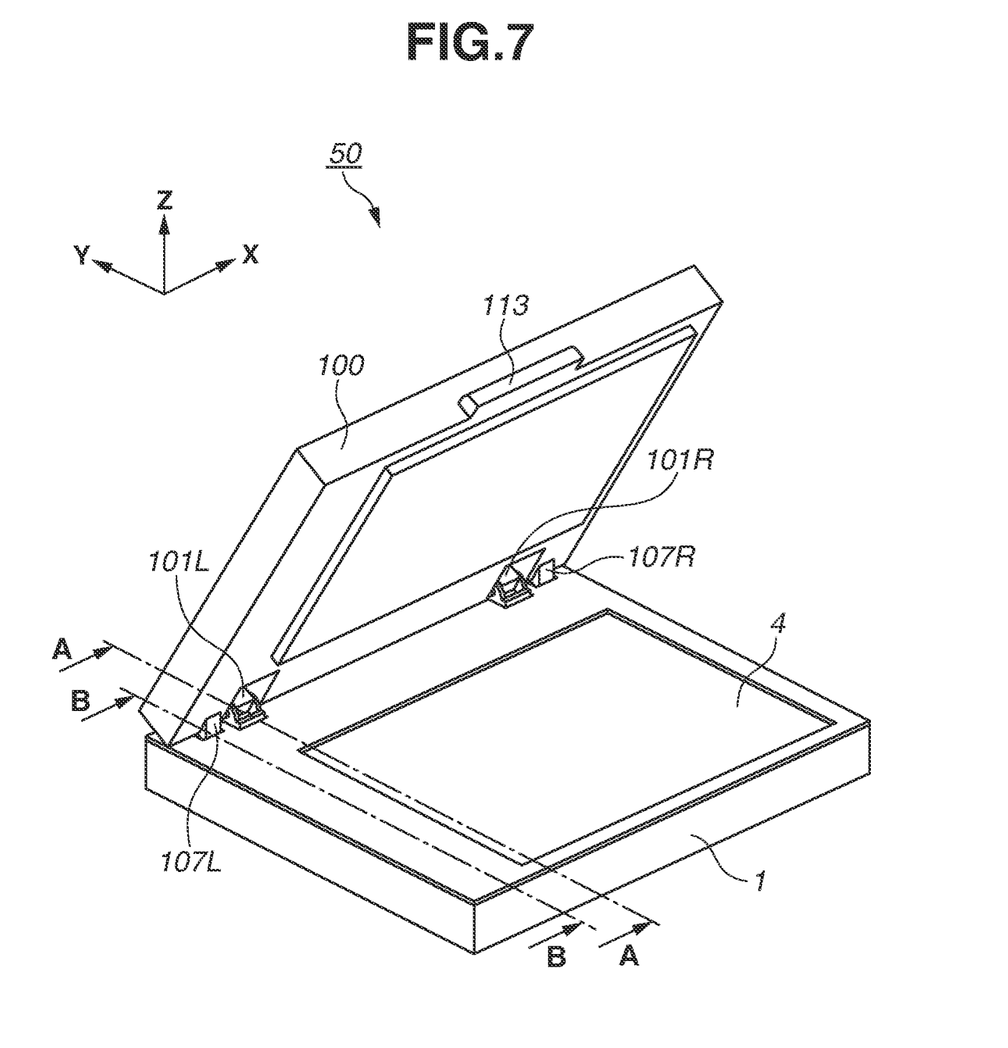
FIG. 7 is a simplified external perspective view of the image reading device.

Next, a configuration for adjusting an open angle of the hinge mechanism 101 and the ADF 100 of the image reading device 50 will be described with reference to FIG. 7 to FIG. 12B. FIG. 7 illustrates an external perspective view of the image reading device 50 by simplifying the image reading device 50 in FIG. 2. A configuration for opening and closing the ADF 100 with respect to the reading main unit 1 will be described in the present specification. However, this can be adopted in a configuration for opening and closing a document cover for pressing a document loaded in the reading main unit 1 against the reading main unit 1.

As illustrated in FIG. 7, the left first stopper portion 107L is provided further outward than the left hinge mechanism 101L, and the right first stopper portion 107R is provided further outward than the right hinge mechanism 101R. FIG. 2 and FIG. 7 both illustrate a state where the ADF 100 is open at an open angle of a first angle 110 (see FIGS. 11A and 11B) with respect to the reading main unit 1 by the first stopper portion 107.

Figure 8:
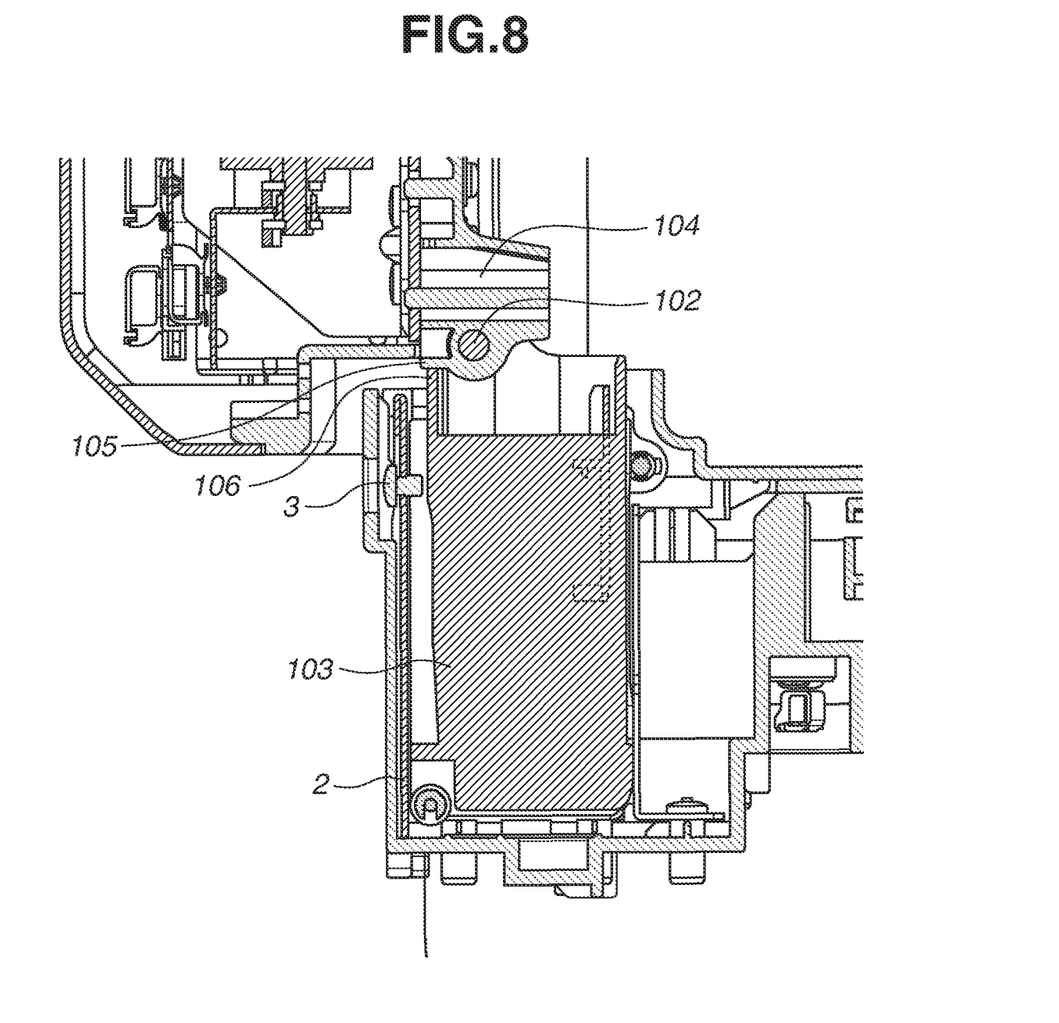
FIG. 8 is a cross-sectional diagram illustrating the image reading device taken along a line A-A in FIG. 2.
Figure 9A:
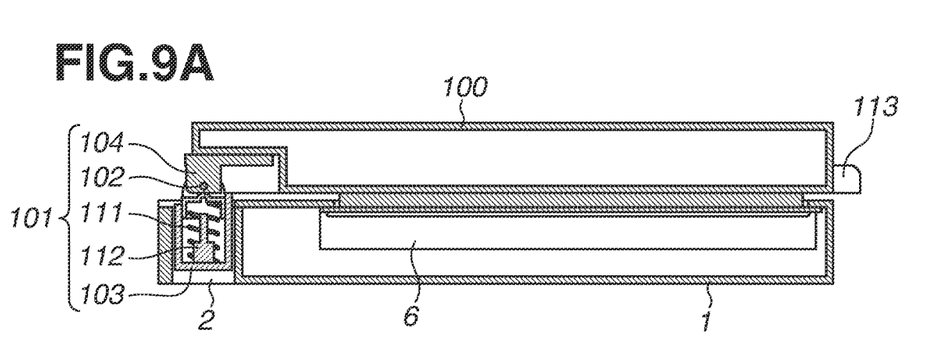
FIGS. 9A, 9B, and 9C are cross-sectional schematic diagrams illustrating the image reading device taken along a line A-A in FIG. 7.
Figure 9B:
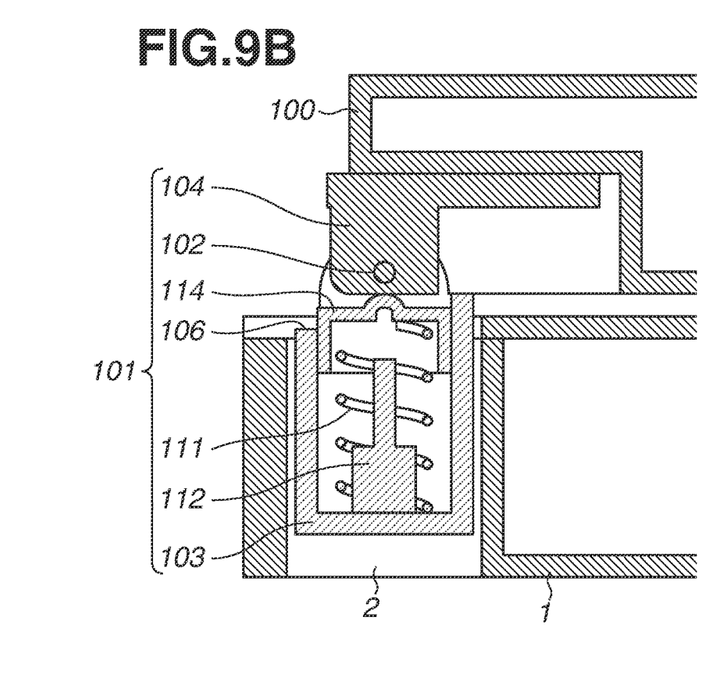
Figure 9C:
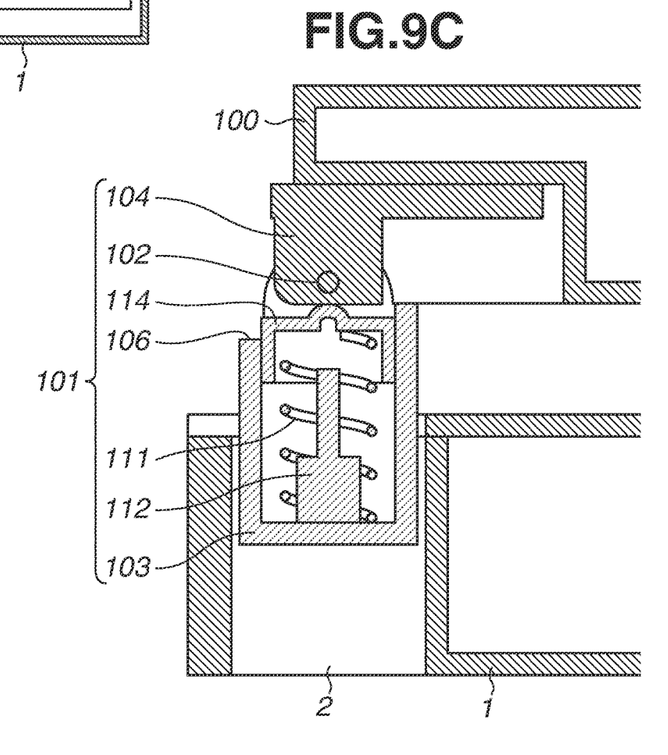

FIG. 8 is a cross-sectional diagram illustrating the left hinge mechanism 101L taken along a line A-A in FIG. 2. The left hinge mechanism 101L will be described below, and the right hinge mechanism 101R has a similar configuration. FIGS. 9A, 9B, and 9C are cross-sectional schematic diagrams illustrating the left hinge mechanism 101L that is simplified and taken along a line A-A in FIG. 7. FIGS. 9A, 9B, and 9C illustrate a state where the ADF 100 is closed with respect to the reading main unit 1. FIG. 9A illustrates a cross-sectional schematic diagram illustrating the entire image reading device 50 taken along the line A-A. FIGS. 9B and 9C each illustrate a cross-sectional schematic diagram illustrating a configuration of the left hinge mechanism 101L taken along the line A-A.

The hinge mechanism 101 is provided with a hinge case 103 that can vertically move, and a hinge cam 104 that is supported to be pivotable with respect to the hinge case 103 via a hinge shaft 102. The hinge cam 104 is fixed to the ADF 100 by a screw. FIG. 9B illustrates a state where the hinge case 103 (the hinge mechanism 101) is located at a lower position (a first position). Specifically, FIG. 9B corresponds to a case where the ADF 100 is closed. FIG. 9C illustrates a state where the ADF 100 is lifted up by the user, and the hinge case 103 (the hinge mechanism 101) is located at an upper position (a second position).

As illustrated in FIGS. 9A, 9B, and 9C, a hinge spring 111 and a hinge damper 112 are provided in the inside of the hinge case 103. The hinge spring 111 is an elastic member, and urges the hinge cam 104 upward via a hinge cam follower 114. This can reduce power necessary when the user opens the ADF 100, and further, this can prevent the ADF 100 from suddenly closing by the own weight. Moreover, the hinge damper 112 produces an effect of smoothing a pivotal movement immediately before the ADF 100 enters the state of being closed with respect to the reading main unit 1. A configuration in which only one of the hinge spring 111 and the hinge damper 112 is provided inside the hinge case 103 may be adopted.

The hinge case 103 is inserted into a hinge slot 2 provided in the reading main unit 1. The hinge mechanism 101 can be vertically moved along the hinge slot 2 by an operation performed by the user. When placing a thick document on the document glass plate 4 to read the document, the user can raise the hinge mechanism 101 as illustrated in FIG. 9C, by lifting up the ADF 100. Raising the hinge mechanism 101 in this way increases the distance between the ADF 100 and the reading main unit 1, so that even a thick document can be uniformly pressed against the document glass plate 4. A hinge removal prevention screw 3 (see FIG. 8) is attached to the reading main unit 1 to prevent removal of the hinge case 103 from the hinge slot 2 due to such a vertical movement operation performed by the user.

As described above, the hinge mechanism 101 is at the lower position, in a state where the ADF 100 is closed and in a state where an ordinary document is loaded on the document glass plate 4. On the other hand, the hinge mechanism 101 is at the upper position, in a state where the ADF 100 is lifted up by the user and in a state where a thick document is loaded on the document glass plate 4.

Figure 10:
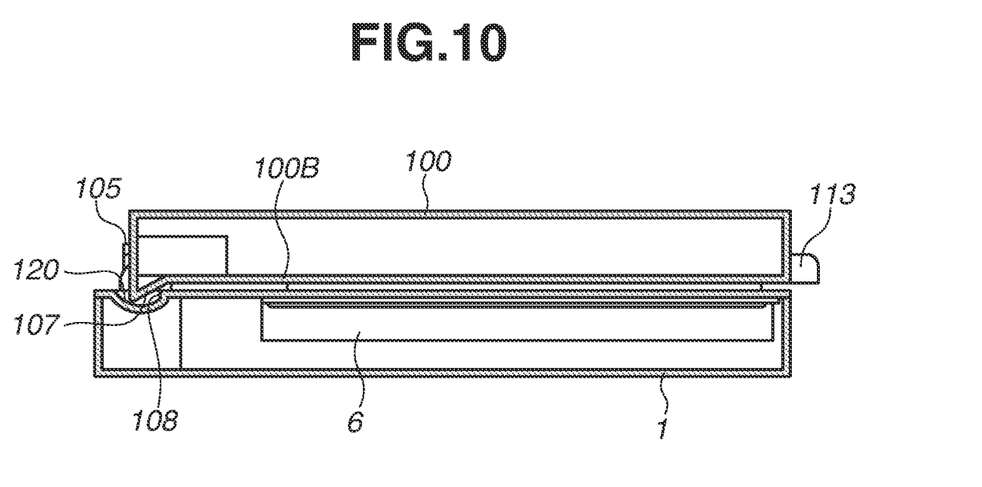
FIG. 10 is a cross-sectional schematic diagram illustrating the image reading device taken along a line B-B in FIG. 7.

FIG. 10 illustrates a cross-sectional schematic diagram illustrating the entire image reading device 50 taken along a line B-B illustrated in FIG. 7. FIG. 10 illustrates a state where the ADF 100 is closed with respect to the reading main unit 1. The first stopper portion 107 has a protrusion shape that protrudes to be below a lower surface 100B of the ADF 100. A recess portion 120 is provided at a position facing the first stopper portion 107 in the reading main unit 1. The recess portion 120 is recessed downward from the top surface of the reading main unit 1. The recess portion 120 has a curved surface. The recess portion 120 is formed so that the first stopper portion 107 that protrudes can pivot when the ADF 100 is opened and closed by the user.

A first abutment portion 108 is provided on the device front side of the recess portion 120. The first abutment portion 108 has a surface (an abutting surface) that intersects the top surface of the reading main unit 1. In the present exemplary embodiment, the first abutment portion 108 has the surface orthogonal to the top surface of the reading main unit 1. The first abutment portion 108 is formed to be able to abut the first stopper portion 107 that pivots when the ADF 100 is opened by the user.

Figure 11A:
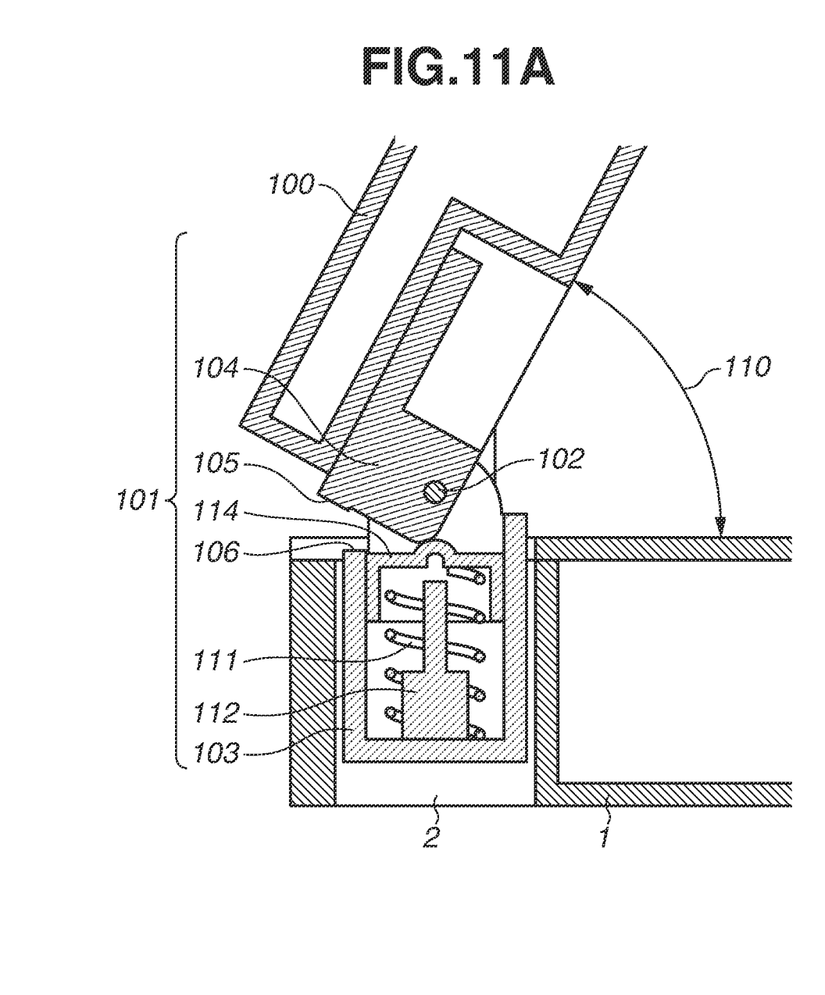
FIGS. 11A and 11B are cross-sectional schematic diagrams illustrating a state where the image reading device is open at a first angle.
Figure 11B:
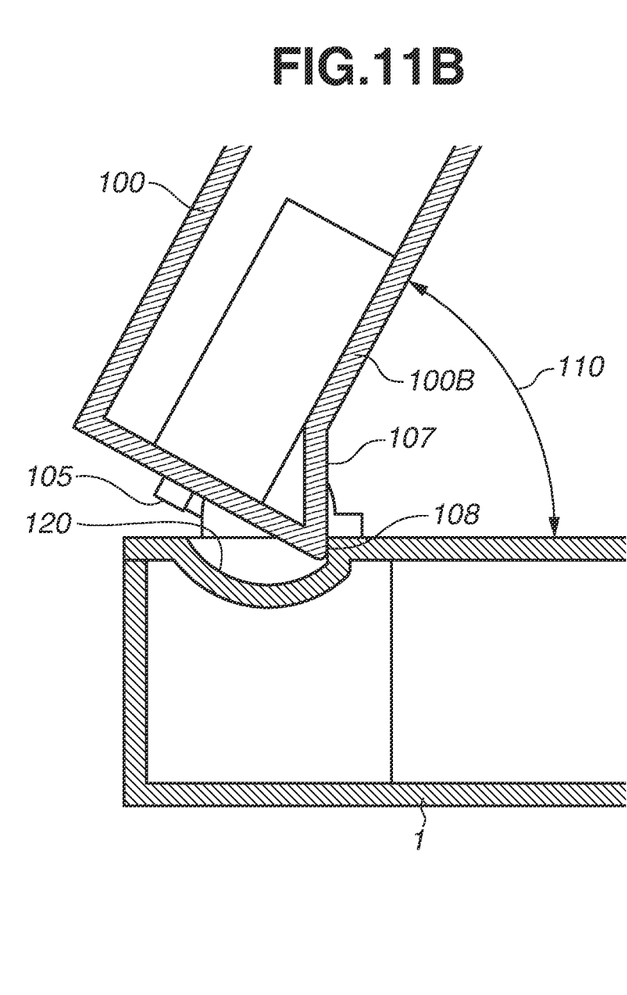

FIGS. 11A and 11B illustrate a state where the ADF 100 is opened at the first angle 110 by the user. FIG. 11A illustrates a cross-sectional schematic diagram illustrating the hinge mechanism 101 (the left hinge mechanism 101L) taken along the line A-A illustrated in FIG. 7. FIG. 11B illustrates a cross-sectional schematic diagram illustrating the first stopper portion 107 (the left first stopper portion 107L) taken along the line B-B illustrated in FIG. 7.

The user moves the ADF 100 upward by holding the hold member 113, so that the hinge cam 104 of the hinge mechanism 101 pivots about the hinge shaft 102 as illustrated in FIG. 11A. In this process, because the hinge mechanism 101 does not vertically move with respect to the hinge slot 2, the hinge mechanism 101 maintains the state at the lower position. When the ADF 100 pivots with the hinge mechanism 101 maintaining the state at the lower position, the first stopper portion 107 abuts the first abutment portion 108 as illustrated in FIG. 11B. This abutment regulates a further pivotal movement of the ADF 100, so that the ADF 100 is held in the state where the ADF 100 is open at the open angle of the first angle 110 with respect to the top surface of the reading main unit 1. In the present exemplary embodiment, the first angle 110 is about 60 degrees. When the open angle of the ADF 100 is regulated to the first angle 110 by the abutment between the first stopper portion 107 and the first abutment portion 108, the open angle of the ADF 100 is not regulated in the hinge mechanism 101 (see FIG. 11A).

Figure 12A:
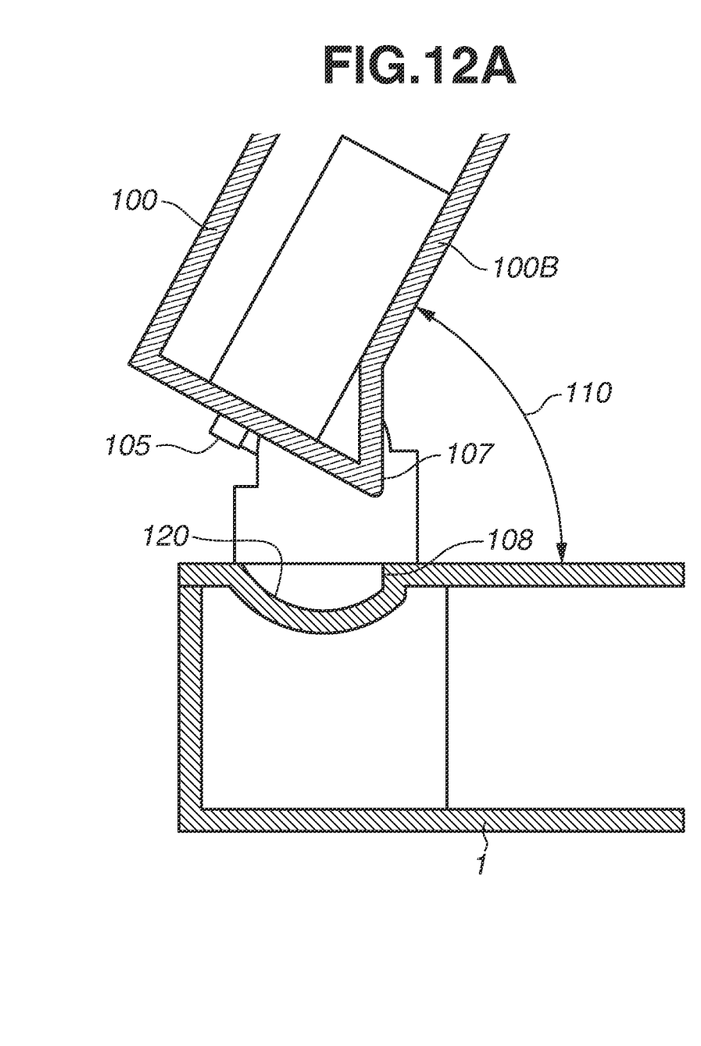
FIGS. 12A and 12B are cross-sectional schematic diagrams illustrating a state where the image reading device is open at a second angle.
Figure 12B:
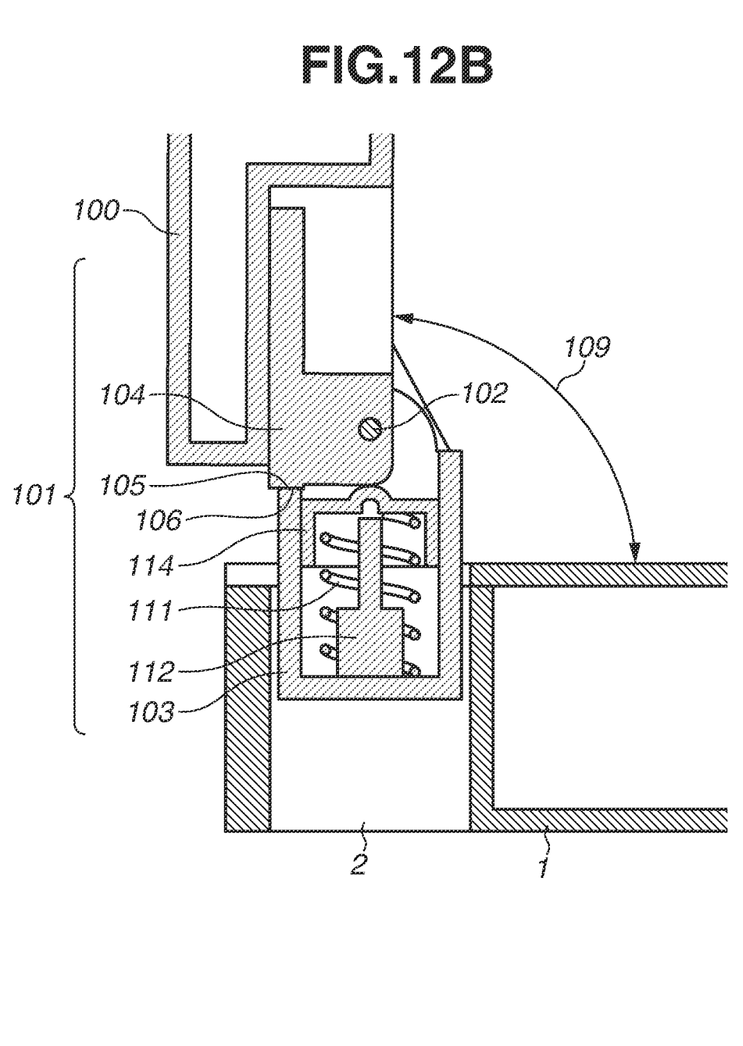

In a case where the image reading device 50 is normally used by the user such as document reading, the user can carry out work if the ADF 100 is open at about 60 degrees as described above. However, during assembly by an operator and device maintenance by a service staff, it is necessary to open the ADF 100 at an angle larger than 60 degrees. FIGS. 12A and 12B illustrate a state where the ADF 100 is opened at a second angle 109 that is larger than the first angle 110 by the operator or the service staff during such work.

FIG. 12A illustrates a cross-sectional schematic diagram illustrating the first stopper portion 107 (the left first stopper portion 107L) taken along the line B-B illustrated in FIG. 7. FIG. 12A illustrates a state where the hinge mechanism 101 is lifted from the state illustrated in FIG. 11B to the upper position. FIG. 12B illustrates a cross-sectional schematic diagram illustrating the hinge mechanism 101 (the left hinge mechanism 101L) taken along the line A-A illustrated in FIG. 7. FIG. 12B illustrates a state where the ADF 100 is open at the second angle 109.

In a case where the user opens the ADF 100 at the second angle 109, the user moves the hinge mechanism 101 to the upper position by lifting up the ADF 100 further from the state where the ADF 100 is open at the first angle 110 illustrated in FIGS. 11A and 11B. When the hinge mechanism 101 is moved to the upper position, the first stopper portion 107 and the first abutment portion 108 are separated as illustrated in FIG. 12A. The abutment between the first stopper portion 107 and the first abutment portion 108 is released and thus the pivotal movement of the ADF 100 is not regulated. Therefore, the operator can pivot the ADF 100 further.

When the ADF 100 is pivoted by the operator so that the ADF 100 is opened at the second angle 109, a second stopper portion (a regulation portion) 105 provided in the hinge cam 104 and a second abutment portion 106 provided in the hinge case 103 abut each other in the hinge mechanism 101 (see FIG. 12B). This abutment regulates a further pivotal movement of the ADF 100, and the ADF 100 is held in the state where the ADF 100 is open at the second angle 109 with respect to the top surface of the reading main unit 1. In the present exemplary embodiment, the second angle 109 is about 90 degrees.

The case where the ADF 100 is opened from the open state at the first angle 110 to the open state at the second angle 109 has been described above. However, the ADF 100 can be opened from the closed state to the open state at the second angle 109 without the angle regulation by the first stopper portion 107 at the first angle 110. In this case, as illustrated in FIG. 9C, the first stopper portion 107 and the first abutment portion 108 can be separated by lifting up the hinge mechanism 101 in a state where the ADF 100 is closed, so that the ADF 100 can be directly opened up to the second angle 109.

The open angle of the ADF 100 can be thus changed, and the following effect can be obtained by providing such a configuration. First, the open angle is regulated to 60 degrees in normal use by the user, so that the user cannot access (come in contact with) the hinge cam 104. Oil such as grease is applied to the hinge cam 104 to smooth a cam sliding motion. In the state where the ADF 100 is open at 60 degrees, the surface to which the oil is applied in the hinge cam 104 is not exposed. Therefore, attachment of the oil to the user and a document is inhibited. On the other hand, in a case where the operator performs work such as assembly and maintenance, visibility and workability can be enhanced by regulating the open angle of the ADF 100 to 90 degrees. For example, also when the document glass plate 4 is removed for replacement, work can be performed without detachment of the ADF 100 from the reading main unit 1.

As described above, the open angle of the ADF 100 can be easily changed by providing a first abutment mechanism based on the first stopper portion 107 and the first abutment portion 108, and a second abutment mechanism based on the second stopper portion 105 and the second abutment portion 106 provided in the hinge mechanism 101. The present exemplary embodiment is not limited to the ADF 100, and can be adopted for the document cover.

It is desirable that the first stopper portion 107 and the first abutment portion 108 be provided near the hinge mechanism 101, and further outward than the hinge mechanism 101. This enhances the rigidity of the image reading device 50, so that unevenness of the open angle of the ADF 100 in the X direction and the Y direction can be inhibited.

The number of changeable open angles may be increased, and this can be implemented by providing another abutment mechanism for an angle between the angle for the first abutment mechanism and the angle for the second abutment mechanism. For example, it is possible to provide a mechanism for enabling abutment between a part of the ADF 100 and a part of the reading main unit 1 when the hinge mechanism 101 is located at a middle position between the upper position and the lower position.

In other words, according to the exemplary embodiment of the present disclosure, the image reading device that can easily change the open angle of the document cover is provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-035517, filed Feb. 28, 2018, which is hereby incorporated by reference herein in its entirety.

What is claimed is:

1. An image reading device comprising:
   a main body including a document platen capable of being loaded with a document and a first reading portion capable of reading the document loaded on the document platen;
   a cover configured to press the document against the document platen; and
   a hinge mechanism configured to connect the main body and the cover, and configured to move between a first position and a second position with respect to the main body,
   wherein the main body includes a first abutment portion capable of abutting the cover,
   wherein an open angle of the cover with respect to the document platen is regulated to a first angle by abutment between the cover and the first abutment portion in a case where the hinge mechanism is in the first position, and the open angle is regulated to a second angle larger than the first angle by the hinge mechanism in a case where the hinge mechanism is in the second position, and
   wherein the cover and the first abutment portion do not abut each other in a case where the open angle is regulated to the second angle.

2. The image reading device according to claim 1, wherein a distance between the cover and the main body in the case where the hinge mechanism is in the second position is larger than the distance in the case where the hinge mechanism is in the first position.

3. The image reading device according to claim 1, wherein the first abutment portion is provided outside the hinge mechanism.

4. The image reading device according to claim 1, wherein the first abutment portion has an abutting surface, the abutting surface is connected to a recess portion formed in a surface of the document platen, the cover has a stopper portion having a protrusion shape, and the open angle is regulated to the first angle by abutment between the stopper portion and the abutting surface.

5. The image reading device according to claim 1, wherein the hinge mechanism has a hinge case that is vertically movable and a hinge cam pivotably supported to the hinge case, and the open angle is regulated to the second angle by abutment between the hinge case and the hinge cam.

6. The image reading device according to claim 1, wherein the cover includes an automatic document conveyance device.

7. The image reading device according to claim 1, wherein the cover includes:
   a conveyance unit configured to convey the document in a first direction,
   a second reading portion configured to read the document conveyed by the conveyance unit,
   an adjustment mechanism configured to adjust an angle of the second reading portion with respect to the first direction, and
   an electrical component connected to the second reading portion,
   wherein the adjustment mechanism is provided on a front side of the image reading device and the electrical component is provided on a rear side of the image reading device.

8. The image reading device according to claim 7, wherein the second reading portion is rotatable about the rear side of the image reading device.

9. An image reading device comprising:
   a main body including a document platen capable of being loaded with a document and a reading portion capable of reading the document loaded on the document platen;
   a cover configured to press the document against the document platen; and
   a hinge mechanism configured to connect the main body and the cover, and configured to move between a first position and a second position with respect to the main body,
   wherein the main body includes a first abutment portion capable of abutting a first stopper portion of the cover, and a second abutment portion capable of abutting a second stopper portion of the cover,
   wherein an open angle of the cover with respect to the document platen is regulated to a first angle by abutment between the first stopper portion and the first abutment portion in a case where the hinge mechanism is in the first position,
   wherein the open angle is regulated to a second angle larger than the first angle by abutment between the second stopper portion and the second abutment portion in a case where the hinge mechanism is in the second position, and
   wherein the first stopper portion and the first abutment portion do not abut each other in a case where the open angle is regulated to the second angle.

10. A printing apparatus comprising:
    a printing unit configured to print an image on a printing medium; and
    an image reading device configured to read a document, wherein the image reading device includes:
    a main body including a document platen capable of being loaded with the document and a first reading portion capable of reading the document loaded on the document platen,
    a cover configured to press the document against the document platen, and
    a hinge mechanism configured to connect the main body and the cover, and configured to move between a first position and a second position with respect to the main body,
    wherein the main body includes a first abutment portion capable of abutting the cover,
    wherein an open angle of the cover with respect to the document platen is regulated to a first angle by abutment between the cover and the first abutment portion in a case where the hinge mechanism is in the first position, and the open angle is regulated to a second angle larger than the first angle by the hinge mechanism in a case where the hinge mechanism is in the second position, and wherein the cover and the first abutment portion do not abut each other in a case where the open angle is regulated to the second angle.

11. The printing apparatus according to claim 10, wherein a distance between the cover and the main body in the case where the hinge mechanism is in the second position is larger than the distance in the case where the hinge mechanism is in the first position.

12. The printing apparatus according to claim 10, wherein the first abutment portion is provided outside the hinge mechanism.

13. The printing apparatus according to claim 10, wherein the first abutment portion has an abutting surface, the abutting surface is connected to a recess portion formed in a surface of the document platen, the cover has a stopper portion having a protrusion shape, and the open angle is regulated to the first angle by abutment between the stopper portion and the abutting surface.

14. The printing apparatus according to claim 10, wherein the hinge mechanism has a hinge case that is vertically movable and a hinge cam pivotably supported to the hinge case, and the open angle is regulated to the second angle by abutment between the hinge case and the hinge cam.

15. The printing apparatus according to claim 10, wherein the cover includes an automatic document conveyance device.

16. The printing apparatus according to claim 10, wherein the cover includes:

a conveyance unit configured to convey the document in a first direction, a second reading portion configured to read the document conveyed by the conveyance unit, an adjustment mechanism configured to adjust an angle of the second reading portion with respect to the first direction, and an electrical component connected to the second reading portion, wherein the adjustment mechanism is provided on a front side of the image reading device and the electrical component is provided on a rear side of the image reading device.

17. The printing apparatus according to claim 16, wherein the second reading portion is rotatable about the rear side of the image reading device.

* * * * *